(12) United States Patent
Jagannathan et al.

(10) Patent No.: US 11,303,500 B1
(45) Date of Patent: *Apr. 12, 2022

(54) STORM DETECTION, ANALYSIS, REMEDIATION, AND OTHER NETWORK BEHAVIOR

(71) Applicant: Virtual Instruments Worldwide, Inc., San Jose, CA (US)

(72) Inventors: Rangaswamy Jagannathan, Sunnyvale, CA (US); Rosanna Lee, Palo Alto, CA (US); Derek Sanders, Saratoga, CA (US); Jing Liu, Cupertino, CA (US); Kishor Kakatkar, Cothrud (IN)

(73) Assignee: Virtual Instruments Worldwide, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,309

(22) Filed: May 28, 2019

Related U.S. Application Data (63) Continuation of application No. 15/079,039, filed on Mar. 23, 2016, now Pat. No. 10,348,549, which is a continuation of application No. 14/834,428, filed on Aug. 24, 2015, now abandoned.

(51) Int. Cl.
| | | |
|---|---|---|
| *H04L 12/24* | (2006.01) | |
| *H04L 12/26* | (2006.01) | |
| *H04L 41/042* | (2022.01) | |
| *H04L 43/16* | (2022.01) | |
| *H04L 41/0686* | (2022.01) | |
| *H04L 41/0681* | (2022.01) | |
| *H04L 41/0631* | (2022.01) | |
| *H04L 41/16* | (2022.01) | |

(52) U.S. Cl.
CPC .......... *H04L 41/042* (2013.01); *H04L 41/065* (2013.01); *H04L 41/0681* (2013.01); *H04L 41/0686* (2013.01); *H04L 41/16* (2013.01); *H04L 43/16* (2013.01); *H04L 41/064* (2013.01)

(58) Field of Classification Search
None
See application file for complete search history.

(56) References Cited

U.S. PATENT DOCUMENTS

| | | | | |
|---|---|---|---|---|
| 6,526,044 | B1* | 2/2003 | Cookmeyer, II | H04L 41/142 370/352 |
| 7,813,822 | B1* | 10/2010 | Hoffberg | H04N 21/44222 700/94 |
| 7,895,320 | B1* | 2/2011 | Oggerino | H04L 41/507 709/224 |
| 9,479,807 | B1* | 10/2016 | Bugajski | H04N 21/84 |
| 2007/0022479 | A1* | 1/2007 | Sikdar | H04L 63/0218 726/22 |
| 2007/0192863 | A1* | 8/2007 | Kapoor | H04L 67/10 726/23 |

* cited by examiner

*Primary Examiner* — Davoud A Zand
(74) *Attorney, Agent, or Firm* — Ahmann Kloke LLP

(57) ABSTRACT

A monitoring device responds to status data to detect storms, analysis, and to attempt to remediate those storms. The monitoring device several types of storms, for each of which it has a technique for analysis of the storm. The monitoring device can determine if the storm is due to resource contention, excess or unbalanced performance activity, or network degradation. Once analyzed, the monitoring device analyzes the storm, and attempts to remediate the cause of the storm.

20 Claims, 4 Drawing Sheets

Figure 3
DNME 301

STORM DETECTION, ANALYSIS, REMEDIATION, AND OTHER NETWORK BEHAVIOR

(1) INCLUDED DISCLOSURES

This application describes technologies that can be used with inventions, and other technologies, described in one or more of the following documents. These documents are sometimes referred to herein as the "Included Disclosures," the "Incorporated Documents," or variants thereof.

| Ser. No. | Filing Date | First Inventor |
| --- | --- | --- |
| 12/180,437 | Jul. 25, 2008 | Derek SANDERS |

"SYMPTOM DETECTION USING BEHAVIOR PROBABILITY DENSITY, NETWORK MONITORING OF MULTIPLE OBSERVATION VALUES TYPES, AND NETWORK MONITORING USING ORTHOGONAL PROFILING DIMENSIONS"
This application is hereby incorporated by reference as if fully set forth herein, and claims priority thereof to the fully extent possible.

| Ser. No. | Filing Date | First Inventor |
| --- | --- | --- |
| 12/791,704 | Jun. 1, 2010 | Kishor KAKATKAR |

"RECORDING, REPLAY, AND SHARING OF LIVE NETWORK MONITORING VIEWS"
This application is hereby incorporated by reference as if fully set forth herein, and claims priority thereof to the fully extent possible.

| Ser. No. | Filing Date | First Inventor |
| --- | --- | --- |
| 62/041,130 | Aug. 24, 2014 | Rosanna LEE |

"PUSH PULL DATA COLLECTION"
This application is hereby incorporated by reference as if fully set forth herein, and claims priority thereof to the fully extent possible.

| Ser. No. | Filing Date | First Inventor |
| --- | --- | --- |
| 14/834,367 | Aug. 24, 2015 | Rosanna LEE |

"PUSH PULL DATA COLLECTION"
This application is hereby incorporated by reference as if fully set forth herein, and claims priority thereof to the fully extent possible.

| Ser. No. | Filing Date | First Inventor |
| --- | --- | --- |
| 62/041,141 | Aug. 24, 2014 | Rosanna LEE |

"CROSS SILO TIME STITCHING"
This application is hereby incorporated by reference as if fully set forth herein, and claims priority thereof to the fully extent possible

| Ser. No. | Filing Date | First Inventor |
| --- | --- | --- |
| 14/834,371 | Aug. 24, 2015 | Rosanna LEE |

"CROSS SILO TIME STITCHING"
This application is hereby incorporated by reference as if fully set forth herein, and claims priority thereof to the fully extent possible

| Ser. No. | Filing Date | First Inventor |
| --- | --- | --- |
| 62/041,140 | Aug. 24, 2015 | Rangaswamy JAGANNATHAN |

"ENHANCED FLOW PROCESSING"
This application is hereby incorporated by reference as if fully set forth herein, and claims priority thereof to the fully extent possible

| Ser. No. | Filing Date | First Inventor |
| --- | --- | --- |
| 14/834,424 | Aug. 24, 2015 | Rangaswamy JAGANNATHAN |

"ENHANCED FLOW PROCESSING"
This application is hereby incorporated by reference as if fully set forth herein, and claims priority thereof to the fully extent possible

| Ser. No. | Filing Date | First Inventor |
| --- | --- | --- |
| 62/041,143 | Aug. 24, 2015 | Derek SANDERS |

"SELF-HELPING AND BEST-PRACTICE PROFILING AND ALERTING WITH RELATIVE AND ABSOLUTE CAPACITY"
This application is hereby incorporated by reference as if fully set forth herein, and claims priority thereof to the fully extent possible

| Ser. No. | Filing Date | First Inventor |
| --- | --- | --- |
| 15/067,168 | Mar. 10, 2016 | Derek SANDERS |

"SELF-HELPING AND BEST-PRACTICE PROFILING AND ALERTING WITH RELATIVE AND ABSOLUTE CAPACITY"
This application is hereby incorporated by reference as if fully set forth herein, and claims priority thereof to the fully extent possible

| Ser. No. | Filing Date | First Inventor |
| --- | --- | --- |
| 62/041,135 | Aug. 24, 2015 | Rangaswamy JAGANNATHAN |

"STORM DETECTION, ANALYSIS, REMEDIATION, AND OTHER NETWORK BEHAVIOR"
This application is hereby incorporated by reference as if fully set forth herein, and claims priority thereof to the fully extent possible Each and every one of these documents is assigned to the same assignee as the assignee named on page 1 of this Application. Each and every one of these documents, as well as all documents cited therein, are hereby incorporated by reference as if fully recited herein. This Application claims priority of each and every one of these documents, to the fullest extent possible.

(2) FIELD OF THE DISCLOSURE

This Application can relate to storm detection, analysis, remediation, and other matters.

For example, this Application can include information relating to techniques for storm detection in a DNME (distributed network monitoring environment, or a related or similar environment). For example, this Application can include information relating to techniques for analysis of storms in a DNME. For example, this Application can include information relating to techniques for remediation (or at least amelioration) of storms in a DNME.

Other and further possibilities are described herein.

(3) BACKGROUND OF THE DISCLOSURE

(3.1) Background not Limiting

The approaches described herein could be pursued, but are not necessarily approaches that have been previously conceived. Therefore, unless otherwise specifically indicated herein, the approaches described herein are not prior art, and are not admitted to be prior art by inclusion herein.

(3.2) Possible Solutions for Fluid Detection

One problem that has arisen, particularly in the field of network monitoring, is maladjustment of the network, particularly with respect to contention for resources available in the network. For example, resources available in the network might be maladjusted or otherwise improperly assigned to elements, in (such as users of) those resources. This might result in excess, or otherwise improper, contention for those resources by elements in the network, with the possible effect that the network does not provide an efficient use of its resources to those users.

These resources might include processor availability, memory or storage availability, network bandwidth availability, network monitoring views, and other resources possibly available to users of the network, whether real or virtual. Maladjustment of any of these aspects of the network can lead to large numbers of alerts (sometimes referred to herein as "storms"), sometimes with respect to issues that have little to do with the resource actually being contended for.

Storms can be caused by a number of different factors. The inventors have identified at least the following as being of particular concern:

Resource contention storms;
Performance activity storms;
Degradation storms; and
other storms for contention for a resource, that are not originally caused
by contention for that particular resource.

(3.2.1) Resource Contention Storms

Resource contention storms can be caused by elements in (such as users of) a DNME (distributed network monitoring environment) attempting to use too much of a shared resource, with the effect that substantially none of those elements are able to use any significant amount of the resource. However, these storms can present to an operator as a large number of alerts that are seemingly irrelevant to the nature of the problem. Examples might include alerts with respect to (a) processor time, (b) memory utilization, (c) storage utilization, (d) network bandwidth utilization, (e) application delivery utilization, and (f) other resources for which the network has only limited capacity.

(3.2.2) Performance Activity Storms

Performance activity storms can be caused by unusual activity in a DNME, such as unusual use of services or applications, and can sometimes be the result of spamming or botnet activity. Examples might include alerts with respect to (a) unusual, email activity, (b) unusual upload activity, (c) unusual download activity, (d) unusual file-sharing activity, (e) unusual application server activity, (f) unusual application client activity, (g) unusual desktop delivery or application delivery, and other unusual activity with respect to available network resources.

(3.2.3) Degradation Storms

Degradation storms can cause noticeable degradation in resource performance, in a distributed network monitoring environment, and might include alerts with respect to (a) virtual machine degradation, (b) application user degradation, (c) desktop user degradation, and other degradation with respect to available network resources.

(3.2.4) In General

In general, alert storms might represent activity by any elements in a DNME; their sources can sometimes be determined by careful analysis of the problem. While this can generally achieve mitigation of the alert storm, the underlying problem can remain un solved, only to reappear (at, most likely of course, the most inopportune possible time), Accordingly, early analysis of alert storms, and if possible, automated remediation, can be desirable.

(3.3) Some Drawbacks of the Known Art

Each of these issues, either alone or in combination with others at some times, or in some conditions, can difficulty in aspects of effective and efficient use of distributed network resources, particularly when applied to one or more devices in in a distributed network monitoring environment.

(4) SUMMARY OF THE DISCLOSURE

(4.1) Introduction

This summary is provided to introduce a selection of concepts in a simplified form, often further described, below in the Detailed Description. This summary is not intended to identify key features of the claimed subject matter, nor should it be used as an aid in determining the scope of the claimed subject matter.

After reading this Application, those skilled in the art would recognize that techniques shown herein are applicable to more than just the specific embodiments shown herein, are within the scope and spirit of the invention, and, would not require undue experiment or further invention.

Some particular implementations could include one or more of the following:

(4.1.1) Alert Storms

A system includes apparatus, such as a distributed set of resources in a DNME, that can identify alert storms arising from maladjustment of the network, can review the nature of those alert storms to analyze their cause, and can recommend or initiate remediation of the root cause of the alert storm.

In one embodiment, resource contention can be identified in response to an alert storm, even when the resource being contended for is not the resource for which alerts are being generated. For example, when a computing device has multiple virtual machines ready to run, but none are able to obtain any processor time, possibly the virtual machines are unable to run because the hypervisor itself is occupying nearly all the available processor time.

In one embodiment, unusual performance activity can be identified in response to an alert storm, with the effect that the DNME can determine the presence of malware, external cyber-attacks, and possibly other negative activity initiated from outside the DNME. For example, unusual email behavior, such as very high rates of outgoing SMTP (simple mail transport protocol) endpoint usage, and very high rates of outgoing SMTP network bandwidth or message packet count, can indicate an email virus that is sending out many, many email messages, to the detriment of everyone using the DNME.

In one embodiment, performance degradation can be detected in response to an alert storm, with the effect that the DNME can determine when one or more elements of the distributed set of network resources are suffering from lack of capability, or are even about to fail. For example, remote application user degradation can indicate that an application's virtual desktop implementation is possibly about to fail. For example, this might be indicated if the application user starts to report very high latency when using the remote application, or starts to report jitter in presentation of the display desktop.

(4.1.2) Storm Analysis

Upon identification of an alert storm, automated analysis of the DAME can sometimes identify one or more elements whose activities are the source of the alert storm.

(4.1.3) Automated Remediation

Upon identification of the source of an alert storm, identification of some forms of alert storm can also provide automated forms of remediation.

Other and further details, such as other features and exemplary embodiments, are described herein.

(4.2) This Application

After reading this application, those skilled in the art would recognize that techniques shown in this application are applicable to more than just the specific embodiments shown herein. For example, the applicability of the techniques shown herein can broadly encompass a wide variety of network monitoring techniques.

Moreover, after reading this application, those skilled in the art would recognize that techniques shown in this application are applicable, or can be made applicable with relatively small effort that does not include undue experiment or further invention, to circumstances in which the alert information is fuzzy, probabilistic, unclear, unknown, or otherwise. For example, while this Application is primarily directed to alert storms that can be explicitly identified, in the context of the invention, there is no particular requirement for any such limitation. In such cases, the alert information can lead to a probabilistic (or other not-completely-certain) evaluation of whether the alert storm indicates a real problem with the DNME, or merely represents maladjustment of the DNME that can be remedied without great effort. For example, a machine learning system might be able to use information from an alert storm, or a history of alert storms, to identify when maladjustment of the DNME is likely, or when the alert storm is due to some other cause.

Moreover, while this Application is primarily directed to large numbers of alerts that appear in a short span of time, in the context of the invention, there is no particular requirement for any such limitation. For example, an "alert storm" can include one or more circumstances in which alerts occur, but which are not necessarily related in time. For example, if there are a large number of alerts every time the home team wins at baseball (especially if they are the Cubs), this could indicate a maladjustment of the DNME from a combination of computing equipment or human behavior, not necessarily from one or the other alone.

(4.3) Possible Applicability

After reading this Application, those of ordinary skill in the art would recognize that the described embodiments, and inventions described therein, have wide applicability to networking systems, including DNMEs (distributed network monitoring systems) and variants and extensions thereof.

For example, the described embodiments, and inventions described therein, have wide applicability to air (and ground, rail, and sea) traffic control systems; banking and risk-management systems; cloud computing systems; electrical grids, factories, or refineries; and any other type of system in which multiple resources (such as possibly multiple distinct resources) are called upon by multiple independent users.

Other and further techniques, also shown or suggested by this Application, are also applicable to more than just the specific embodiments described herein.

(5) BRIEF DESCRIPTION OF THE FIGURES

Embodiments are illustrated by way of example and not limitation in the figures of the accompanying figures. In the figures, like references indicate similar elements.

After reading this Application, those skilled in the art will recognize that the Figures are not necessarily drawn to scale for construction, nor need they be. After reading this Application, those skilled in the art will recognize that many alternatives, in construction, shape, size, and otherwise, would allow them to make and use the invention, without undue experiment or further invention.

(6) DETAILED DESCRIPTION OF A PREFERRED EMBODIMENT (6.1) Terminology (6.1.1) Generality of the Description Ideas and technologies shown or suggested by this Application should be thought of in their most general form, including without limitation, considering one or more of the following:

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

The phrases and terms "disposed," "disposed for," "disposed to," and variants thereof, generally refer to the possibility that a particular element, collection of elements, portion of an element, or linkage between or among elements, is capable of (and optionally, well suited to) performing the described activity.

When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art will recognize that those apparatus elements or method steps need not necessarily include or perform those particular subparts or sub-steps. In the context of the invention, no such particular subparts or sub-steps are particularly required. In an alternative embodiment, apparatus elements or method steps without those sub-parts or sub-steps would be workable, are within the scope and spirit of the invention, and would not require undue experiment or further invention.

The phrases and terms "in one example," "in one embodiment," "in one implementation," "in one scenario," "in possible examples," "in possible embodiments," "in possible implementations," "in possible scenario," and variants thereof, generally refer to the possibility that a particular characteristic, feature, or structure, described herein is included in at least one possible embodiment of the invention. Multiple uses of this phrase do not necessarily all refer to the same possible embodiment. Rather, the specific particular characteristic, feature, or structure, described herein might be combined in any suitable manner into one or more distinct possible embodiments.

The phrases and terms "perform," and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be performed by an emulated device, such as a virtual machine, "sandbox" environment, or otherwise. A program of instructions can be performed in part, halted or paused or stopped, transferred to another device, in whole or in part, and possibly continued.

The phrases and terms "relatively," and variants thereof, generally refer to any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer to any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.

The phrases and terms "techniques," and variants thereof, generally refer to any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment.

(6.2) Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead, Ideas and technologies shown or suggested by, or specific to, this. Application should be thought of in their most general form, including without limitation, considering one or more of the following:

The terms and phrases "collate," and variants thereof, generally indicate that the status data information can be collected in an arrangement, order, structure, or otherwise, not equal to the way it was collected. For example, status data information can be thought of as collated when it arrives out of time order at a network monitoring device from a network device (possibly due to network delay or some other characteristic of the communication between the network monitoring device and the network device). Alternatively, status data can be thought of as collated when it arrives in a first format, and is converted to a second format, by one or more computing devices.

The terms and phrases "data storage," and variants thereof, generally indicate one or more real or virtual devices that are capable of maintaining data or information for later access, either by the same device that stored the data or information, or by another device.

The terms and phrases "monitoring device," "network monitoring," and variants thereof, generally indicate one or more real or virtual devices that can perform the functions of monitoring, network devices, or their activity, such as by determining or gleaning status data information, collating that status data information, and processing that collated status data information.

The terms and phrases "network device," and variants thereof, generally indicate any device including computational capacity, such as a real or virtual processing substrate, a real or virtual data storage element, a real or virtual network communication element, a real or virtual memory, or otherwise.

The terms and phrases "local monitoring element," "reporting element," and variants thereof, generally indicate any portion of one or more network devices, or some combination or conjunction thereof, that can include the capability of generating a report of status data information. For example, a network device that can include a virtual machine, when the virtual machine can provide status data information to the network monitoring device, can include a reporting element.

The terms and phrases "status data," and variants thereof, generally indicate any information indicating activity or capability of a network device, such as processing capacity, memory capacity, storage capacity, network activity, or otherwise. Status data is not generally limited to capacity, and can include expandability, latency, reliability, size, or any other feature useful in the field of computing that can include computing devices.

The terms and phrases "silo," and variants thereof, generally indicate any division of status data information into categories of activity, capability, capacity, or otherwise. For example, network bandwidth and processing power can be in distinct silos of status data information, as can the difference between either of those measures and any measure from the group: memory, data storage, application servers, virtual machine capacity, or otherwise.

In general, a "device" can be a real device, that is, a physical device that performs the functions it is described to perform herein; or a virtual device, that is, another type of device that emulates, simulates, or otherwise performs the functions that device is described to perform. For example, a real storage device can include a disk drive, operating under control of a driver controller, that accepts commands from users and responds to those commands with responses. Alternatively, a virtual storage device can include a distributed network of processors, each having access to a database, that similarly accepts commands from users and responds to those commands with responses.

Any terms appearing in the figures but not explicitly described in this Application should be apparent to those skilled in the art.

After reading this application, those skilled in the art would realize that the invention is not in any way limited to the specifics of any particular example. Many other variations are possible that remain within the content, scope and spirit of the invention, and these variations would be clear to those skilled in the art, without undue experiment or further invention.

Figure 1:
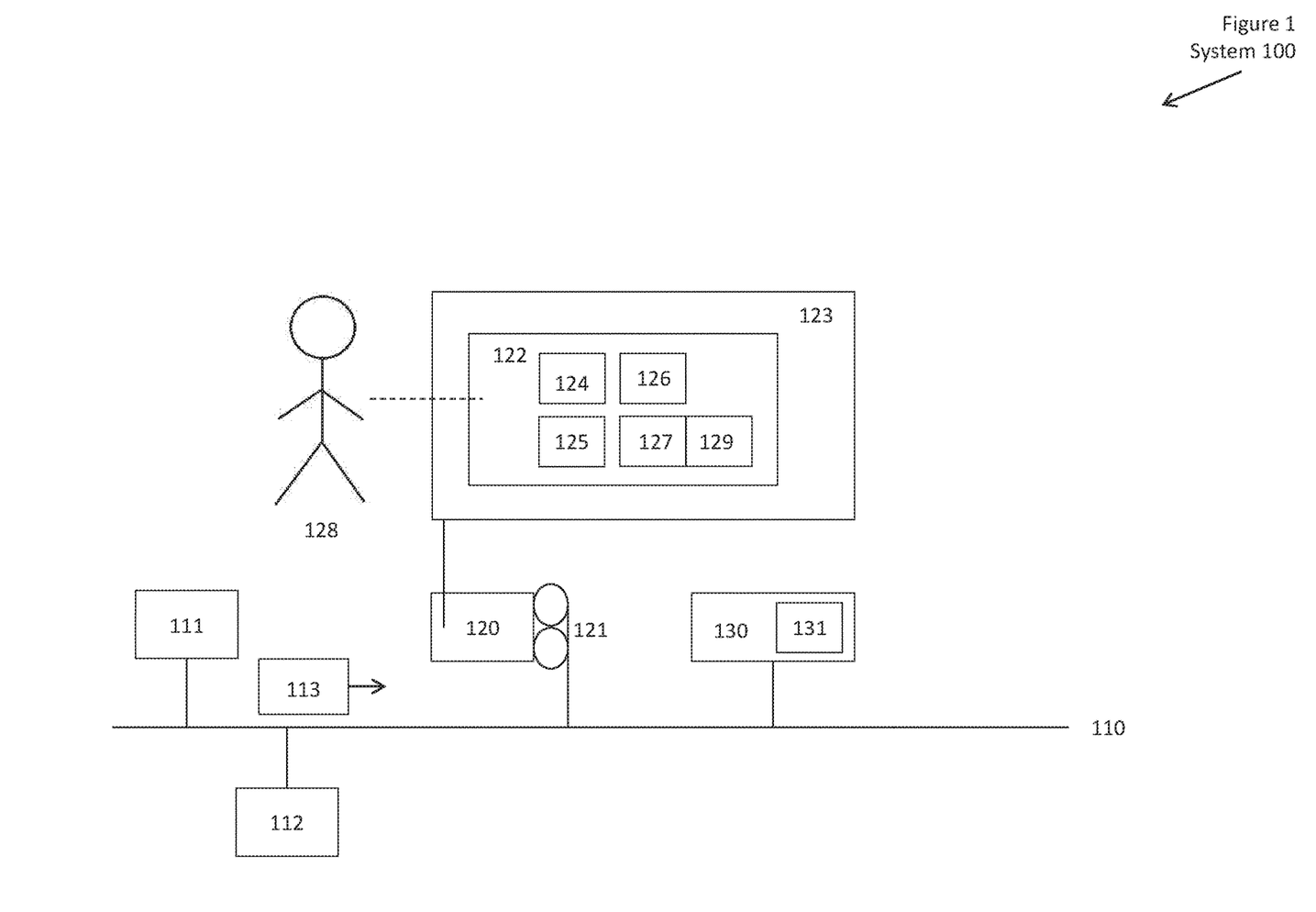
FIG. 1 shows a conceptual drawing of a system, and method of making the same.

(6.3) Figures and Text (6.3.1) FIG. 1

FIG. 1 shows a conceptual drawing of a system, and method of making the same.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

FIG. 1, Element Identifiers

System elements and sub-elements are sometimes described herein with respect to the following reference numbers and/or names:

FIG. 1, configuration of Elements

A system 100 includes elements described herein, other elements shown in the figure, and possibly other elements. Not all elements are required. Elements should be considered optional, unless otherwise specified or unless clearly obvious for operation of the system.

Communication Network

The system 100 can include a communication network 110, suitably disposed to interact with other elements described herein. In general, when elements described herein communicate, they do so using the communication network 110. The communication network 110 can include one or more network devices 111, such as network routers, and can be disposed as a TCP/IP network, an IEEE 802.11 wireless communication network 110, an Ethernet or other local communication network 110, a subdivision of the Internet, or otherwise. The communication network 110 can also include one or more network monitoring devices 112, coupled to the communication network 110, and capable of reviewing message packets 113 that are transmitted on the communication network 110, without interfering with transmission or reception of those message packet 113.

Computing Device

The system 100 (in particular, the network devices 111) can include one or more computing devices 120, such as computing servers, quantum computers, or other types of computing devices. Each particular computing device 120 of the one or more computing devices 120 can include one or more ports 121 coupling the particular computing device 120 to the communication network 110, with the effect that the particular computing device 120 can exchange message packets 113 with other devices coupled to the communication network 110.

Virtual Machine

Each particular computing device 120 can also include one or more virtual machines 122, each virtual machine 122 being capable of being controlled by a hypervisor 123 that is executed by the particular computing device 120. Each virtual machine 122 can include a host operating system 124 (controlled by the hypervisor 123) and one or more guest operating systems 125 (each controlled by a host operating system 124). Each virtual machine 122 can also include one or more application servers 126 (controlled by the guest operating system 125), each capable of receiving messages from a client device (a particular network device 111, as otherwise and further described herein) and capable of responding to those messages.

Virtual Desktop

Each virtual machine 122 can execute an application server 126 that presents a virtual desktop 127 to one or more users 128. In such cases, the virtual desktop 127 can include one or more output elements (such as a display screen and/or a speaker), and be responsive to one or more input devices (such as a keyboard and/or a pointing device), each showing one or more application programs executing in a windowing system, with the effect that a particular user 128 can interact with the virtual desktop 127, using the communication network 110, as if the particular user 128 were physically present at the virtual machine 122 and, by implication, at the particular computing device 120 on which that virtual machine 122 is executed.

Virtual Desktop Implementation

In one embodiment, one or more of those virtual desktops 127 can include, or be coupled to, a virtual desktop implementation 129. The virtual desktop implementation 129 can include a software program executed by the virtual machine 122, capable of exchanging message packets 113 with the user 128, in which the message packets 113 can be substantially compressed and can include substantial error correcting coding. This can have the effect that communication between the virtual desktop 127 and the user 128 can be sufficiently smooth as if the virtual desktop 127 and the user 128 were physically local, and that their exchange of messages using the communication network 110 were substantially invisible to the user 128.

Database

In one embodiment, the system 100 can include a database 130, or other data maintenance or data, storage element, capable of maintaining status data information communicated, using the message packets 113, between the one or more network devices 111 and the one or more network monitoring devices 112. The database 130 can be disposed substantially locally, such as substantially directly coupled to the communication network 110, or can be disposed substantially remotely, such as substantially indirectly coupled to other elements that are eventually coupled to the communication network 110. The database 130 can include one or more real or virtual data stores 131, such as disk drives, flash drives, or other storage techniques.

Network Monitoring

In one embodiment, the system 100 can include one or more network monitoring devices 112, as described herein. The network monitoring devices 112 can be disposed to exchange message packets 113 with the one or more network devices 111, the one or more computing devices 120, the one or more virtual machines 122, the one or more virtual desktop implementations 129, the one or more databases 130, and any other elements coupled to the system 100. For example the one or more network monitoring devices 112 can exchange message packets 113 with the one or more network devices 111, with the effect that the network monitoring devices 112 can receive status data information with respect to any interaction in the system 100. This can include interactions between any pair of devices (whether same or different) described herein.

Alternative Embodiments

After reading this Application, those having ordinary skill in the art will recognize that the particular elements described herein, their particular cooperation and organization, and their particular use as described herein, can be substantially altered while remaining within the scope and spirit of the invention, and that such alterations would work without undue experiment or further invention.

Figure 2:
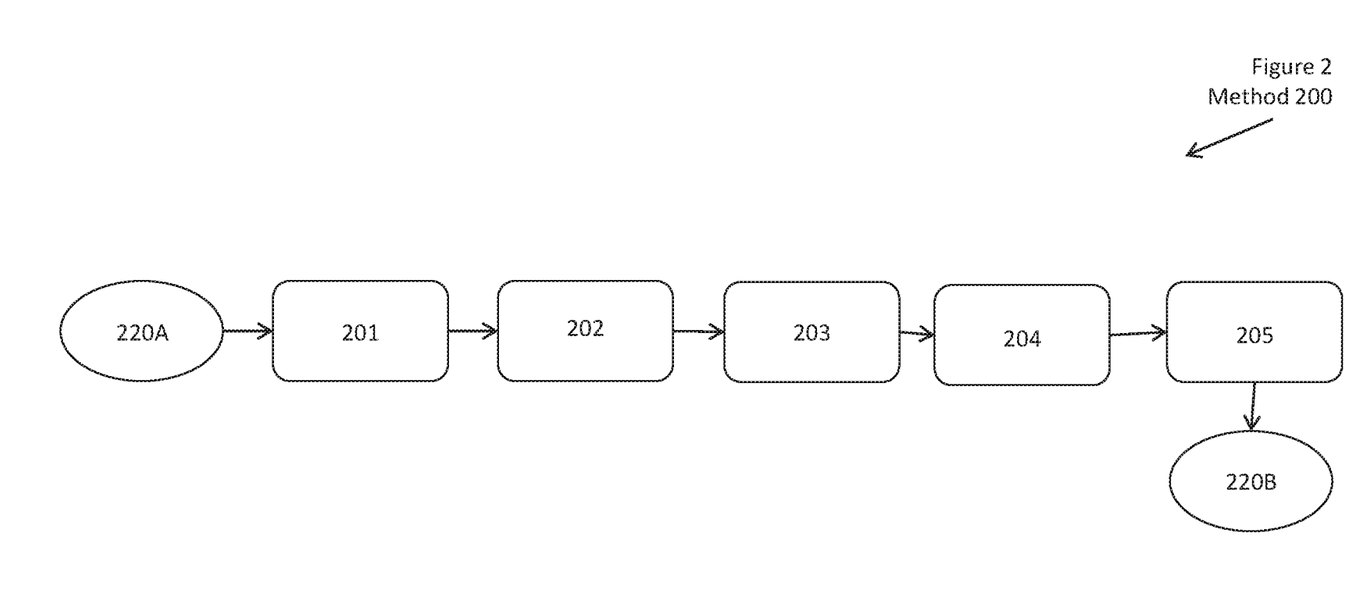
FIG. 2 shows a conceptual drawing of a method of operation.

(6.3.2) FIG. 2

FIG. 2 shows a conceptual drawing of a method of operation.

A method 200 includes flow points and method steps as described herein, other elements shown in the figure, and possibly other elements. Not all elements are required. Elements should be considered optional, unless otherwise specified or unless clearly obvious for operation of the system.

These flow points and method steps are, by the nature of the written word, described in one particular order. This description does not limit the method to this particular order. The flow points and method steps might be performed in a different order, or concurrently, or partially concurrently, or otherwise in a parallel, pipelined, quasi-parallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

Although the nature of text necessitates that the flow points and steps are shown in a particular order, in the context of the invention, there is no reason for any such limitation. The flow point may be reached, and the steps may be performed, in a different order, or may be performed by co-routines or recursive functions, or may be performed in a parallel or pipelined manner, or otherwise.

Use of Method with System

The system 100, or portions of the system 100, can be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

FIG. 2, Element Identifiers

System elements and sub-elements are sometimes described herein with respect to the following reference numbers and/or names:

FIG. 2, Flow Points and Method Steps

Beginning of Method

A flow point 200A indicates that the method 200 is ready to start.

At this flow point, the method 200 can initialize variables and reset/set state, as appropriate.

The method 200 proceeds with both flow points 220A and 240A. In one embodiment, this can be conducted in parallel, and the method 200 can perform the steps following those flow points in parallel, concurrently, or in any other reasonably convenient order, as determined by the network monitoring device 112.

Identify Alert Storm

At a step 201, the network monitoring device 112 attempts to determine if the alert storm is due to resource contention.

In one embodiment, there are at least five types of resource contention:
- (a) processor time,
- (b) memory utilization,
- (c) storage utilization,
- (d) network bandwidth utilization, and
- (e) application delivery utilization, each of which can be experienced in a distributed network monitoring environment.

In one embodiment, as part of this step, the network monitoring device 112 at tempts to determine if there is processor time resource contention that might have led to the alert storm. If there are multiple virtual machines 122 operating on the same computing device 120, but none of them is able to obtain any processor cycle time, there is a possibility of resource contention. If at approximately the same time, the hypervisor 123 for that computing device 120 is occupying a large amount of processor cycle time, it is likely that the resource contention is between the hypervisor 123 and the virtual machines 122, not, between the virtual machines 122 themselves. In such cases, the method 200 determines that the alert storm is due to that resource contention. The method 200 can proceed with the step 204. Otherwise, the method 200 continues with the rest of this step.

In one embodiment, as part of this step, the network monitoring device 112 attempts to determine if there is memory utilization resource contention that might have led to the alert storm. If there are multiple virtual machines 122 operating on the same computing device 120, but none of them is able to obtain any memory, there is a possibility of resource contention. If at approximately the same time, the hypervisor 123 for that computing device 120 is itself occupying a large amount of memory, such as if the hypervisor 123 is "ballooning" (borrowing memory from other processes), it is likely that the resource contention is between the hypervisor 123 and the virtual machines 122, not between the virtual machines 122 themselves. In such cases, the method 200 determines that the alert storm is due to that resource contention. As described herein, the method 200 can proceed with the step 204. Otherwise, the method 200 continues with the rest of this step.

In one embodiment, as part of this step, the network monitoring device 112 attempts to determine if there is storage utilization resource contention that might have led to the alert storm. If there is a data storage element that is exhibiting large latency, and there are one or more virtual machines attempting to use that data storage element, and show a large number of disk operations per second, or the data storage element is itself showing a large number of disk operations per second, it is likely that the resource contention is between the virtual machine 122 and every other element attempting to use that data storage element. In such cases, the method 200 determines that the alert storm is due to that resource contention. As described herein, the method 200 can proceed with the step 204. Otherwise, the method 200 continues with the rest of this step.

In one embodiment, as part of this step, the network monitoring device 112 attempts to determine if there is network bandwidth utilization resource contention that might have led to the alert storm. If there is a network interface that is exhibiting large utilization, and there are one or more paths between a computing device 120 and a portion of the communication network 110 that is exhibiting large round trip latency, it is likely that the resource contention is between the computing device 120 attempting to use the communication network 110, and every other element attempting to use that communication network 110. In such cases, the method 200 determines that the alert storm is due to that resource contention. As described herein, the method 200 can proceed with the step 204. Otherwise, the method 200 continues with the rest of this step, In one embodiment, as part of this step, the network monitoring device 112 attempts to determine if there is application delivery utilization resource contention that might have led to the alert storm. If there are multiple application users 128 each using a remote application and exhibiting large application-specific traffic roundtrip latency, or exhibiting large jitter, or exhibiting large processing latency, and the remote application itself is showing a larger number of sessions than rated, or is exhibiting large traffic roundtrip latency, or exhibiting large jitter, or exhibiting large processing delay, it is likely that the resource contention is between too many users 128 attempting to use the remote application concurrently. In such cases, the method 200 determines that the alert storm is due to that resource contention. As described herein, the method 200 can proceed with the step 204. Otherwise, the method 200 continues with the next step.

Identify Nature of Alert Storm

At a step 202, the network monitoring device 112 attempts to determine if the alert storm is due to unusual performance activity.

In one embodiment, there are at least several types of unusual performance activity:
- (a) unusual email activity,
- (b) unusual upload activity,
- (c) unusual download activity,
- (d) unusual file-sharing activity,
- (e) unusual application server activity, and
- (f) unusual application client activity, each of which can be experienced in a distributed network monitoring environment.

In, one embodiment, as part of this step, the network monitoring device 112 attempts to determine if there is unusual email activity that might have led to the alert storm. If there are a large number of outgoing SMTP endpoints (network devices 111 or users 128) and there is a large outgoing SMTP bandwidth utilization or packet count, it is likely that there is unusual activity. In such cases, the method 200 determines that the alert storm is due to that unusual activity. As described herein, the method 200 can proceed with the step 204. Otherwise, the method 200 continues with the rest of this step.

In one embodiment, as part of this step, the network monitoring device 112 attempts to determine if there is unusual upload activity that might have led to the alert storm. If there are outgoing upload protocols (FTP, HTTP, HTTPS, or variants thereof) with a large amount of outgoing bandwidth utilization or outgoing packet count, it is likely that there is unusual activity. In such cases, the method 200 determines that the alert storm is due to that unusual activity. As described herein, the method 200 can proceed with the step 204. Otherwise, the method 200 continues with the rest of this step.

In one embodiment, as part of this step, the network monitoring device 112 attempts to determine if there is unusual download activity that might have led to the alert storm. If there are incoming download protocols (FTP, HTTP, HTTPS, or variants thereof) with a large amount of incoming bandwidth utilization or incoming packet count, it is likely that, there is unusual activity. In such cases, the method 200 determines that the alert storm is due to that unusual activity. As described herein, the method 200 can proceed with the step 204. Otherwise, the method 200 continues with the rest of this step.

In one embodiment, as part of this step, the network monitoring device 112 at tempts to determine if there is unusual file-sharing activity that might have led to the alert storm. If there are a large number of file-sharing services (such as "BitTorrent," or variants thereof), with a large amount of outgoing endpoint count (devices or users) and a large amount of outgoing bandwidth utilization or outgoing packet count, it is likely that there is unusual activity. In such cases, the method 200 determines that the alert storm is due to that unusual activity. As described herein, the method 200 can proceed with the step 204. Otherwise, the method 200 continues with the rest of this step.

In one embodiment, as part of this step, the network monitoring device 112 attempts to determine if there is unusual application server activity that might have led to the alert storm. If there are a large number of remote application instances or sessions, and a large amount of incoming or outgoing application bandwidth utilization, it is likely that there is unusual activity. In such cases, the method 200 determines that the alert storm is due to that unusual activity. As described herein, the method 200 can proceed with the step 204. Otherwise, the method 200 continues with the rest of this step.

In one embodiment, as part of this step, the network monitoring device 112 attempts to determine if there is unusual application client activity that might have led to the alert storm. If there are a large number of remote application instances or sessions, and a large amount of incoming or outgoing application bandwidth utilization, it is likely that there is unusual activity. In such cases, the method 200 determines that the alert storm is due to that unusual activity. As described herein, the method 200 can proceed with the step 204. Otherwise, the method 200 continues with the next step.

Alert Storm Due to Degradation?

At a step 203, the network monitoring device 112 attempts to determine if the alert storm is due to degradation.

In one embodiment, there are at least three types of degradation:
(a) virtual machine degradation,
(b) application user degradation, and
(c) desktop user degradation,
each of which can be experienced in a distributed network monitoring environment.

In one embodiment, as part of this step, the network monitoring device 112 attempts to determine if there is virtual machine degradation that might have led to the alert storm. If there are a large number of virtual machines that are blocked waiting for their processor, or exhibit large memory ballooning, or exhibit large disk latency, it is likely that there is degradation. In such cases, the method 200 determines that the alert storm is due to that degradation. As described herein, the method 200 can proceed with the step 204. Otherwise, the method 200 continues with the rest of this step.

In one embodiment, as part of this step, the network monitoring device 112 attempts to determine if there is application user degradation that might have led to the alert storm. If there is a user 128 exhibiting large remote application round trip time or large jitter, it is likely that there is degradation. In such cases, the method 200 determines that the alert storm is due to that degradation. As described herein, the method 200 can proceed with the step 204. Otherwise, the method 200 continues with the rest of this step.

In one embodiment, as part of this step, the network monitoring device 112 attempts to determine if there is desktop user degradation that might have led to the alert storm. If there is a user 128 exhibiting large remote application round trip time, large jitter, large amounts of time blocked waiting for the processor, large memory ballooning, or large disk latency, it is likely that there is degradation. In such cases, the method 200 determines that the alert storm is due to that degradation. As described herein, the method 200 can proceed with the step 204. Otherwise, the method 200 continues with the flow point 200g.

Analyze Alert Storm

At a step 204, the network monitoring device 112 attempts to analyze the alert storm.

In one embodiment, as part of this step, if all endpoints (network devices 111 or users 128) are involved in causing the alert storm, the method 200 determines that all such endpoints are "equally responsible," and does not take action to restrain any one of them. Alternatively, the method 200 could take action to restrain one of the endpoints at random, in the hope that this would ameliorate the alert storm.

In one embodiment, as part of this step, if one or more endpoints are involved in causing the alert, storm, and others suffer from its effects, the method 200 determines that the endpoints causing the alert storm are responsible, and takes action to restrain them, in the hope that this would ameliorate the alert storm.

In one embodiment, as part of this step, if all endpoints suffer from the effects of the alert storm, the method 200 determines that the distributed network monitoring environment is underprovisioned, and presents that information to an operator, in the hope that the operator can ameliorate the alert storm.

Alert Storm Due to Saturation?

At, a step 205, the network monitoring device 112 attempt to determine if the alert storm is due to saturation. If so, the method 200 determines that the distributed network monitoring environment is saturated, and presents that information to an operator, in the hope that the operator can ameliorate the alert storm.

Method Completed

A flow point 200B indicates that the method 200 is finished. When the next alert storm occurs, the method 200 returns to the earlier flow point 200A.

When the user 101 desires to repeat the method 200, the method 200 proceeds with the flow point 200A.

Figure 3:
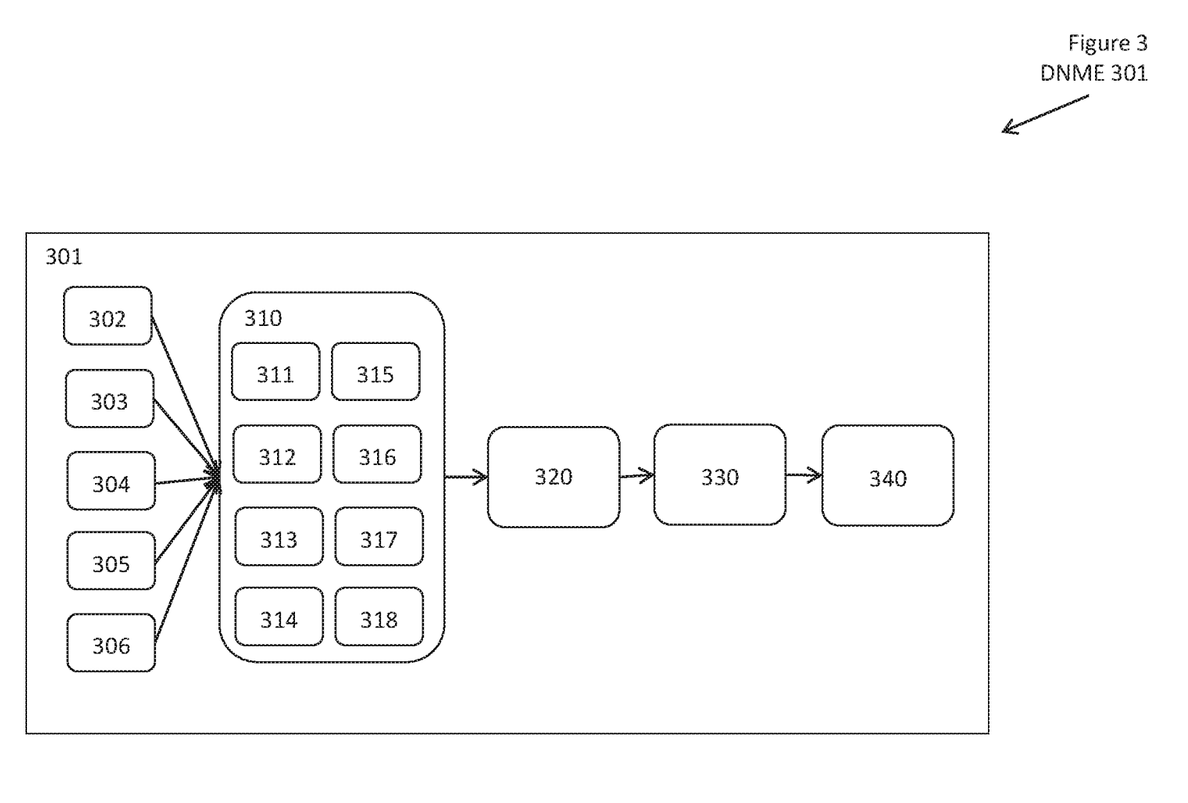
FIG. 3 shows a conceptual drawing of a flow diagram of data in a system, and a method of conducting that flow diagram.

(6.4) FIG. 3

FIG. 3 shows a conceptual drawing of a flow diagram of data in a system, and a method of conducting that flow diagram.

The DNME (dynamic network monitoring environment) 100 can include a RTMS ADCE (real-time multi-silo agentless data collection engine) 301. The RTMS ADCE 301 can include a set of users (already described herein), who can couple to the DNME 100 using any one of a LAN (local area network), WAN (wide area network), or another type of mobile connection; information can be collected from these users. Similarly, the RTMS ADCE 301 can include applications 302, network services 303 (such as VDS, Nexus1K, physical network services, and possibly others), server resources 304 (vSphere, Hyper-V, and possibly others), storage resources 305 (generic storage, NetApp storage, and possibly others), desktop resources 306 (Windows, Linux, and possibly others), and possibly other resources.

Information can be collected from the RTMS ADCE 301 to one or more RTIM DMCEs (real time in memory discovery, mapping, and collation engines) 310. The RTIM DMCEs can include one or more sets of data mappings for users 311, desktops 312 (real or virtual), hosts 313 (real hosts), virtual machines 314 (virtual hosts), applications 315 (real or virtual), data stores 316 (real or virtual), network paths 317 (real or virtual), storage paths 318 (real or virtual), and possibly other resource measures. These are sometimes referred to herein as measurement silos.

Information can be collected from the RTIM DMCEs 310 to one or more AIS IS PPE (advanced inter-silo and intra-silo performance profiling engines) 320. The AIS IS PPEs 320 can include best-practice and self-learnt, end-to-end performance profiles. "Best-practice and self-learnt, end-to-end performance profiles" are described in other and further detail in the Included Disclosures.

Information can be collected from the AIS IS PPEs 320 to one or more IPSDREs (instant performance storm detection and remediation engines) 330. The IPSDREs 330 can include detection of one or more of: real time critical alerts; causal storm analysis; remediation recommendations; and possibly other ameliorative actions. "Instant performance storm detection and remediation engines" are described in other and further detail in the Included Disclosures.

Information can be collected from the IPSDREs 330 to one or more SCS DEs ("specialized and contextual streaming dashboard engines) 340. The SCS DEs 340 can include executive dashboards VI dashboards, VDI dashboards, "MyDashboard," "Storm Dashboards" (real or virtual), and possibly other presentation engines. Dashboard engines and presentation engines are described in other and further detail in the Included Disclosures.

Figure 4:
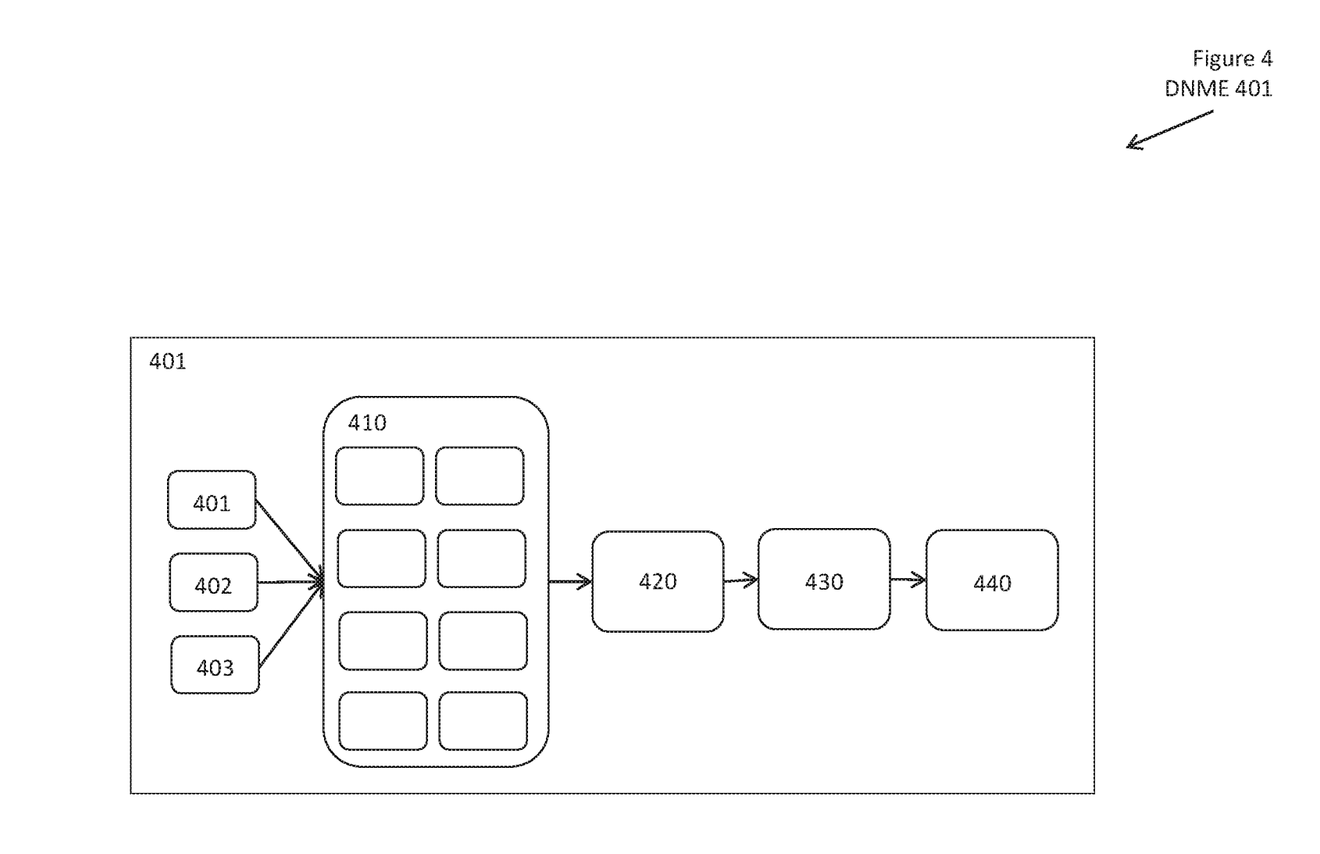
FIG. 4 shows a conceptual drawing of a flow diagram of data in a system, and a method of conducting that flow diagram.

(6.5) FIG. 4

FIG. 4 shows a conceptual drawing of a flow diagram of data in a system, and a method of conducting that flow diagram.

The DNME (dynamic network monitoring environment) 100 can include one or more data collection groups, including one or more of: a network push/pull data collection group 401, a compute push/pull data collection group 402, a storage push/pull data collection group 403, and possibly other data collection groups. In one embodiment, the network push/pull data collection group 401 can receive information from (physical and virtual) routers and switches 404. In one embodiment, the compute push/pull data collection group 402 can receive information from (physical and virtual)>servers 405; sometimes referred to herein as hypervisors, containers, or physical servers. In one embodiment, the storage push/pull data collection group 403 can receive information from (physical and virtual) storage elements 406; sometimes referred to herein as SAN (storage attached network) and direct access storage.

In one embodiment, each of the data collection groups 401, 402, 403 can provide its information in silos to one or more time stitched object metric collation elements 410. The time stitched object metric collation elements 410 can include one or more silos for users, identities, identity groups, services, interfaces, storage controllers, storage volumes, and possibly other resource silos. As noted above, information maintained in resource silos is described in other and further detail in the Included Disclosures.

In one embodiment, information from the time stitched object metric collation elements 410 can be collected into one or more best practice and dynamic threshold based performance, efficiency, and capacity alerting elements 420. The best practice and dynamic threshold based performance, efficiency, and capacity alerting elements 420 can determine whether to generate alerts, and whether to indicate that alert storms are being generated by the DNME 100. As described herein, the best practice and dynamic threshold based performance, efficiency, and capacity alerting elements 420 are described in other and further detail in the Included Disclosures.

In one embodiment, information from the best practice and dynamic threshold based performance, efficiency, and capacity alerting elements 420 can be collected by one or more resource contention storm detection, analysis, recommendation, and remediation elements 430. The contention storm detection, analysis, recommendation, and remediation elements 430 can determine whether alert storms are being generated, and if so, their cause. Upon determining their cause, the contention storm detection, analysis, recommendation, and remediation elements 430 can recommend solutions or remedial techniques. As described herein, the contention storm detection, analysis, recommendation, and remediation elements 430 are described in other and further detail in the Included Disclosures.

In one embodiment, information from the contention storm detection, analysis, recommendation, and remediation elements 430 can be presented to one or more operators or users in either live (or recorded, yet continuous) user interfaces 440, on one or more of: app dashboards, DVR recordings, visual trouble tickets, or possibly other techniques for showing operators or users the operation of the DNME 101. The live (or recorded, yet continuous) user interfaces can show operators or users the progress of the DNME 101 as alerts, alert storms, resource contention, or possibly other network issues arise that are of interest to operators or users. As described herein, the live (or recorded, yet continuous) user interfaces 440 are described in other and further detail in the Included Disclosures.

(6.6) Alternative Embodiments

While this application is primarily described with respect to push pull data collection, after reading this Application, those of ordinary skill in the art will recognize that there is no particular requirement for any such limitation. For example, techniques described herein can also be applied to other circumstances in which it is desired to retrieve dynamic data and collate that dynamic data (possibly received out of order) into a unified sequence, which is in a specified order. For example, the techniques described and suggested herein (including machines, methods, articles of manufacture, and compositions of matter) can be applied to any time-sensitive system, including sensors, robotics, machine learning, dynamic compression and expansion of data streams, or otherwise.

(6.7) Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations and/or conjunctions thereof. Embodiments of the invention are not necessarily limited to computing de-vices, but can also include any form of device or method that can improve techniques for improving the effect of the machine operations described herein.

In one particular implementation, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; and/or otherwise.

(6.8) Specification not Limiting

After reading this Application, those skilled in the art would recognize that the invention is not limited to only the specifically described embodiments, that many variations are within the scope and spirit of the invention, and would be workable without undue experiment or further invention.

(6.7) Claims Included in Specification

The Claims in this Application are hereby included by reference in the text of the Specification.

The invention claimed is:

1. A system comprising:
one or more processors; and
memory containing executable instructions, the executable instructions being executable by the one or more processors to perform a method, the method comprising:
monitoring, by a network monitoring device, network status data from one or more reporting devices coupled to a distributed network monitoring environment, the distributed network monitoring environment having a plurality of endpoints coupled thereto, the endpoints disposed to access resources available using the distributed network monitoring environment;
detecting, by an alert storm detection element of the network monitoring device, an alert storm, the alert storm including an unusually large number of alert related to the same resource at an endpoint, the resource including one or more of: processor time, memory utilization, storage utilization, network bandwidth utilization, and application delivery utilization;
identifying, by the alert storm analysis element, one or more endpoints of the distributed network monitoring environment causing the alert storm; and
if a subset of the one or more endpoints did not cause at least a subset alerts of the alert storm, providing, by an alert storm ameliorating element, a report of analysis for a network operator, the report indicating the same resource, the at least the subset of the one or more endpoints, and an indication that no automatic action has been taken,
if the subset of the one or more endpoints did cause at least a subset alerts of the alert storm, restricting, by an alert storm ameliorating element, network services to at least one endpoint of the one or more endpoints.

2. The system of claim 1, wherein the resource includes processor time, and the alert storm is responsive to resource contention between a hypervisor at a device and virtual machines hosted at that device.

3. The system of claim 1, wherein when the resource includes memory utilization, and the alert storm is responsive to a hypervisor at a device using sufficient memory that virtual machines at that device are starved for resources.

4. The system of claim 1, wherein when the resource includes memory utilization, and the alert storm is responsive to resource contention between a hypervisor at a device and virtual machines hosted at that device.

5. The system of claim 1, wherein when the resource includes storage utilization, and the alert storm is responsive to one or more of:
a data storage element at a device exhibits large latency, and virtual machines attempting to use that data storage element show a large number of disk operations per second; and
the data storage element at the device itself exhibits a large number of disk operations per second.

6. The system of claim 1, wherein when the resource includes storage utilization, and the alert storm is responsive to resource contention between a particular virtual machine and each other element attempting to use the data storage element.

7. The system of claim 1, wherein when the resource includes network bandwidth utilization, and the alert storm is responsive to a network interface that is exhibiting large utilization, and there are one or more paths between a computing device and a portion of a communications network that is exhibiting large latency.

8. The system of claim 1, wherein when the resource includes network bandwidth utilization, and the alert storm is responsive to resource contention between a particular computing device attempting to use a communication network and each other device attempting to use the communication network.

9. The system of claim 1, wherein when the resource includes application delivery utilization, and the alert storm is responsive to one or more of:
multiple application users are each using a particular remote application and exhibiting large application-specific traffic round-trip latency, exhibiting large jitter, or exhibiting large processing latency; and
the particular remote application is showing a larger number of sessions than rated, or is itself exhibiting large traffic round-trip latency, large jitter, or large processing delay.

10. The system of claim 1, wherein the identifying the one or more endpoints of the distributed network monitoring environment is based on one or more of:
    unusual performance activity with respect to email, uploading, downloading, file-sharing, one or more application servers, one or more application clients; and
    degradation of one or more of: a particular virtual machine, a particular application user, a particular desktop user.

11. A method comprising:
    monitoring, by a network monitoring device, network status data from one or more reporting devices coupled to a distributed network monitoring environment, the distributed network monitoring environment having a plurality of endpoints coupled thereto, the endpoints disposed to access resources available using the distributed network monitoring environment;
    detecting, by an alert storm detection element of the network monitoring device, an alert storm, the alert storm including an unusually large number of alert related to the same resource at an endpoint, the resource including one or more of: processor time, memory utilization, storage utilization, network bandwidth utilization, and application delivery utilization;
    identifying, by an alert storm analysis element, one or more endpoints of the distributed network monitoring environment causing the alert storm; and
    if a subset of the one or more endpoints did not cause at least a subset alerts of the alert storm, providing, by an alert storm ameliorating element, a report of analysis for a network operator, the report indicating the same resource, the at least the subset of the one or more endpoints, and an indication that no automatic action has been taken,
    if the subset of the one or more endpoints did cause at least a subset alerts of the alert storm, restricting, by an alert storm ameliorating element, network services to at least one endpoint of the one or more endpoints.

12. The method of claim 11, wherein when the resource includes processor time, and the alert storm is responsive to resource contention between a hypervisor at a device and virtual machines hosted at that device.

13. The method of claim 11, wherein when the resource includes memory utilization, and the alert storm is responsive to a hypervisor at a device using sufficient memory that virtual machines at that device are starved for resources.

14. The method of claim 11, wherein when the resource includes memory utilization, and the alert storm is responsive to resource contention between a hypervisor at a device and virtual machines hosted at that device.

15. The method of claim 11, wherein when the resource includes storage utilization, and the alert storm is responsive to one or more of:
    a data storage element at a device exhibits large latency, and virtual machines attempting to use that data storage element show a large number of disk operations per second; and
    the data storage element at the device itself exhibits a large number of disk operations per second.

16. The method of claim 11, wherein when the resource includes storage utilization, and the alert storm is responsive to resource contention between a particular virtual machine and each other element attempting to use the data storage element.

17. The method of claim 11, wherein when the resource includes network bandwidth utilization, and the alert storm is responsive to a network interface that is exhibiting large utilization, and there are one or more paths between a computing device and a portion of a communications network that is exhibiting large latency.

18. The method of claim 11, wherein when the resource includes network bandwidth utilization, and the alert storm is responsive to resource contention between a particular computing device attempting to use a communication network and each other device attempting to use the communication network.

19. The method of claim 11, wherein when the resource includes application delivery utilization, and the alert storm is responsive to one or more of:
    multiple application users are each using a particular remote application and exhibiting large application-specific traffic round-trip latency, exhibiting large jitter, or exhibiting large processing latency; and
    the particular remote application is showing a larger number of sessions than rated, or is itself exhibiting large traffic round-trip latency, large jitter, or large processing delay.

20. A nontransitory computer readable medium comprising instructions executable by a processor, the instructions being executable to perform a method, the method comprises:
    monitoring, by a network monitoring device, network status data from one or more reporting devices coupled to a distributed network monitoring environment, the distributed network monitoring environment having a plurality of endpoints coupled thereto, the endpoints disposed to access resources available using the distributed network monitoring environment;
    detecting, by an alert storm detection element of the network monitoring device, an alert storm, the alert storm including an unusually large number of alert related to the same resource at an endpoint, the resource including one or more of: processor time, memory utilization, storage utilization, network bandwidth utilization, and application delivery utilization;
    identifying, by an alert storm analysis element, one or more endpoints of the distributed network monitoring environment causing the alert storm; and
    if a subset of the one or more endpoints did not cause at least a subset alerts of the alert storm, providing, by an alert storm ameliorating element, a report of analysis for a network operator, the report indicating the same resource, the at least the subset of the one or more endpoints, and an indication that no automatic action has been taken,
    if the subset of the one or more endpoints did cause at least a subset alerts of the alert storm, restricting, by an alert storm ameliorating element, network services to at least one endpoint of the one or more endpoints.

* * * * *